UNITED STATES PATENT OFFICE.

FRANK M. HALDEMAN, OF CLEVELAND, OHIO, ASSIGNOR TO THE MASTER BUILDERS COMPANY, OF CLEVELAND, OHIO, A CORPORATION OF OHIO.

AGGREGATE FOR CONCRETE.

1,113,555.  Specification of Letters Patent.  Patented Oct. 13, 1914.

No Drawing.  Application filed May 4, 1914.  Serial No. 836,326.

*To all whom it may concern:*

Be it known that I, FRANK M. HALDEMAN, a citizen of the United States, residing at Cleveland, in the county of Cuyahoga and State of Ohio, have invented a certain new and useful Improvement in Aggregates for Concrete, of which the following is a full, clear, and exact description.

This invention relates to cement or concrete structures and has for its object the production of a material whereby the surface of such structure may be hardened, toughened, solidified and rendered impervious to liquids, and also whereby a new layer or section of concrete may be efficiently bonded to a previously existent structure of similar or dissimilar material.

It has long been noted that concrete on account of its porosity is highly affected by climatic changes, particularly by the action of water, and accordingly expands and contracts markedly, frequently becoming cracked and broken by the strain. Also this porous condition renders the mass friable and causes the formation of a large amount of dust in case the concrete structure be subjected to heavy traffic as in the case of floors, walks, and roadways. Besides the capacity of ordinary concrete for absorbing and transmitting moisture is frequently objectionable. It is well known that the finer grained aggregates will ordinarily produce a less porous concrete than the coarser aggregates, but this fineness can be carried successfully only to a certain point in the case of silicious aggregates since the very fine sands (by which I mean those which will pass through a sieve having fifty holes to the linear inch) are almost always of a very smooth and glassy surface, frequently even having their edges ground away by attrition, so that it is impossible to secure such adhesion of the cement as shall result in a durable concrete. The few mineral compounds which retain an irregular surface or hackly fracture after being finely pulverized are either so friable mechanically or so impermanent chemically as to be unavailable.

It has heretofore been proposed to employ with the cement an aggregate consisting of finely divided metallic iron particles owing to the fact that these iron particles are of very irregular formation and the cement adheres to the same with great tenacity. Experience has shown that a cement of this nature when properly mixed and of fresh, standard materials and applied in a thorough and careful manner is permanent over long periods of time and without any appreciable oxidation or deterioration of the iron content. However, this iron material is ordinarily obtained by sifting the iron waste of machine shops and is consequently more or less mixed with oil so that it is very difficult to wet the same properly with water, or to obtain the proper adhesion of the cement thereto. Also the rusting of the particles is certain to be avoided only in case the particles are carefully and thoroughly incorporated with the cement which is impeded by the oily film with which the particles are covered.

It is the object of the present invention to provide an aggregate which shall have all the fineness and irregularity of the iron particles heretofore mentioned; which shall be more easily wetted with water during the process of mixing than the iron above mentioned; which shall be less liable to oxidation than the iron aggregate above mentioned; and to which the cement will adhere with a greater strength than to other aggregates; while further objects and advantages will become apparent as the description proceeds.

I have discovered that if finely crushed metallic iron particles be agitated in contact with air at a temperature of from 700° to 900° C. for a few minutes, the oily matters will be entirely driven off and the surface of each grain will be covered with a very thin film of magnetic oxid which will adhere very tenaciously to the cement and which will effectively inhibit any further oxidation of the particles. The operation is a kind of roasting process and causes a change in color of the particles from the gray of metallic iron to a kind of bluish black. Microscopic examination shows each particle to be covered with an iridescent film of oxid, the play of colors indicating that the thickness of the oxid film is of the order of magnitude of the wave length of light.

In the preparation of my improved aggregate I obtain clean iron borings, filings, or turnings, and sift them through a screen of 15 to 20 openings to the linear inch. The part that fails to pass through this sieve can be partially recovered by crushing or pounding or it can be discarded. The sifted material is then spread upon a large fire brick bed and roasted in free contact with the air for a period of from five to fifteen minutes. The material is raked out to form a layer from two to four inches deep and is re-raked or turned over every few minutes during the roasting operation. It is found that any long quiescence causes a caking together of the mass and a formation of ferric sesquioxid ($Fe_2O_3$) instead of the magnetic oxid ($Fe_3O_4$).

During the first part of the roasting operation large quantities of oil-smoke are evolved, which may be caught in a hood and carried away. It generally takes from three to five minutes to eliminate all the oil and about ten to twelve minutes at the temperature indicated to oxidize the particles the desired amount. Doubtless the rapidity of oxidation would be enhanced by preheating the air or by projecting the particles directly into an oxidizing atmosphere, but I prefer to conduct the process slowly and at the lowest feasible temperature since none of the iron must be permitted to turn to ferric sesquioxid and only a very thin film of the magnetic oxid is desirable. Ferric sesquioxid is a loose friable powder and has no strength in connection with cement. Also it is ineffective to inhibit further oxidation and is even thought by some to encourage oxidation. The magnetic oxid, however, forms a thin continuous skin over the metal and prevents the access of moisture and oxygen thereto. Also if care be taken that this be confined to a thin film it will not exhibit any tendency to scale away from the metal, while the natural jagged shape of the grains will not be materially obliterated. If the oxidation were to be continued too long a time or at too high a temperature the coating of oxid would become too thick and would tend to cleave away from the particles as well as obliterating the sharper edges. For the same reason I prefer to remove by sifting or by suction the smallest particles of the iron borings such as those smaller than 1/200th inch in diameter, since the tendency of these is to become too far oxidized during the roasting process. The proper condition of the particles can readily be determined by a microscopic investigation since they should possess an irridescent luster due to a thinness of magnetic oxid film about equal to the wave length of light and should also possess an irregular surface not noticeably obliterated by the oxidation.

The aggregate thus produced will be found to absorb water with great avidity, mix with cement very readily and resist further oxidation for long periods of time. It is used by mixing with cement and water in the usual manner and is applied either as a bonding coat to secure new concrete to old concrete or as a finishing coat to the surface of new concrete, or even by mixing directly with cement and sand in the production of the concrete as in the case of any other aggregate. However, the use for bonding and for surfacing are most important since these uses afford the maximum of utility compared with the amount of material employed. For use in bonding, I prefer to mix equal parts of my improved aggregate together with a fresh alkaline cement and wet with water to form a thin paste which is immediately brushed or thrown upon the surface of the original concrete and followed immediately with the new concrete which is to be secured thereto.

For surfacing concrete I prefer to dust upon the face of the concrete immediately after it is laid and before it has set, a dry mixture of this aggregate and fresh alkaline cement in substantially equal parts, then to float the same into the surface of the concrete until the dust coat has been thoroughly wetted with water from beneath and until the particles of aggregate are thoroughly coated with the pasty cement, then to trowel thoroughly the surface so produced, repeating the troweling at different stages of the setting so that the surface may be thoroughly compacted and the cement forced snugly into contact at all points with the surface of the iron particles. This produces a coating of great beauty, luster, hardness, smoothness and wearing qualities and is proving useful for docks, warehouses, factories, libraries, stores, and offices as well as for roofs, walls and roadways.

While I have described my invention in detail I do not confine myself to the mechanisms, times, or manipulations herein suggested or to the particular uses mentioned, or in any other way except as specifically limited in the claims hereto annexed or as rendered necessary by the prior state of the art.

Having thus described my invention, what I claim is:—

1. A composition of matter containing cement, water, and finely disintegrated metallic iron particles, each of said iron particles having upon its surface a thin filmiform coating of magnetic oxid of iron.

2. A concrete structure having its surface portions formed of cement and finely disintegrated metallic iron particles, each of said iron particles being covered with a thin, substantially uniform filmiform coating of magnetic oxid of iron.

3. A concrete structure having its surface portions formed of finely disintegrated metallic iron particles, each of said iron particles being covered with a thin, substantially uniform filmiform coating of magnetic oxid of iron, and adjacent iron particles being surrounded and spaced apart by a matrix of set cement.

In testimony whereof, I hereunto affix my signature in the presence of two witnesses.

FRANK M. HALDEMAN.

Witnesses:
HAROLD E. SMITH,
T. A. BERTSCH.